United States Patent [19]

Richards

[11] Patent Number: 5,318,794
[45] Date of Patent: Jun. 7, 1994

[54] PROCESS FOR PRODUCING CARAMEL HAVING A HIGH CONTENT OF FRUCTOSE OLIGOSACCHARIDES AND CARAMEL PRODUCT PRODUCED THEREBY

[75] Inventor: Geoffrey N. Richards, Missoula, Mont.

[73] Assignee: The University of Montana, Missoula, Mont.

[21] Appl. No.: 983,446

[22] Filed: Dec. 2, 1992

[51] Int. Cl.$^5$ .................... C08B 30/00; A23L 1/22
[52] U.S. Cl. ................... 426/658; 426/540; 127/DIG. 1; 536/4.1
[58] Field of Search .............. 426/250, 540, 658, 660; 127/DIG. 1; 536/4.1

[56] References Cited

U.S. PATENT DOCUMENTS

| | | | |
|---|---|---|---|
| 236,991 | 1/1881 | Curran | 426/658 |
| 2,594,538 | 4/1952 | Brabaek | 426/658 |
| 3,385,733 | 5/1968 | Ackerman | 426/658 |
| 4,358,469 | 11/1982 | Lavic | 426/658 |
| 4,614,662 | 9/1986 | Ramaswamy | 426/658 |
| 4,753,814 | 6/1988 | Gilmore | 426/658 |
| 5,206,355 | 4/1993 | Richards et al. | 536/4.1 |

FOREIGN PATENT DOCUMENTS 733457  5/1966  Canada .

OTHER PUBLICATIONS

Tschiersky, H., Baltes, W. "Unteersuchungen an Caramel: Curiepunkt-Pyrolyse von Caramelzuckersirupen und andere strukturspezifische Untersuchungen", Z Lebensm Unters Forsch (1989) 189:132–137.

Mechanism of Thermal Degradation of Sucrose, A Preliminary Study—Aust. J. Chem–1978, vol. 31, pp. 1825–1832.

Publication from a German journal–Z. Lebensm Unters Forsch (1989) 189 pp. 132–137.

Chemical Abstract publication–Kitoaka et al., Shimane Noka Daigaku Kenkyu Hokoku, 1967, vol. 15, pp. 19–24.

Primary Examiner—Jeanette Hunter
Attorney, Agent, or Firm—Lowe, Price, LeBlanc & Becker

[57] ABSTRACT

A method for producing caramel having a high content of fructose oligosaccharides and caramel product produced thereby is disclosed which comprises mixing sucrose and an organic acid in a ball mill for approximately 0.5 to 4 hours, heating to a temperature of 130°–160° C. for 0.5 to 15 minutes and cooling quickly to produce a caramel product. The ball milling reduces crystallinity and intimately mixes the sucrose and organic acid, lowering the thermolization temperature. The product contains a high proportion of fructose oligosaccharides (D.P. ~3–10).

18 Claims, No Drawings

PROCESS FOR PRODUCING CARAMEL HAVING A HIGH CONTENT OF FRUCTOSE OLIGOSACCHARIDES AND CARAMEL PRODUCT PRODUCED THEREBY

TECHNICAL FIELD

The present invention relates to a method of producing caramel and the caramel products produced thereby. In particular, the present invention relates to a method of producing caramel having a high content of fructose oligosaccharides.

BACKGROUND OF THE INVENTION

Fructose oligosaccharides have nutritional advantages in animal and human diets. These oligosaccharides modify intestinal bacteria and in particular are effective in increasing the proportion of bifidobacteria in the digestive tract of animals. Thus, caramels containing a high proportion of fructose oligosaccharides are more nutritional.

Caramels are products obtained by heating glucose (or other reducing sugars), or sucrose. Typically, the carbohydrates may be heated either dry or with water, either alone or after addition of acid or base or nitrogen compounds, either in a batch or continuous process. The time generally required to achieve caramelization is several hours, typically from 3 to 9 hours.

The composition of caramels has been studied previously and caramels prepared from sucrose have been shown to contain small amounts of oligosaccharides, predominantly glucose disaccharides.

According to the present invention, it has been discovered that a caramel product may be prepared having a high content of fructose oligosaccharides wherein sucrose and an organic acid are milled prior to thermolysis. The milled product is subsequently heated at a temperature of about 5° to 25° C. above the melting point temperature for approximately 0.5 to 15 minutes, and cooled rapidly. The caramel product formed contains a high proportion of fructose oligosaccharides.

Canadian Patent No. 733,457 is directed to a continuous process of producing caramelization by heating sucrose and citric acid to a temperature of 120°–150° C. for approximately 1–10 minutes, however, there is no disclosure that the sucrose and citric acid are to be milled for several hours.

U.S. Pat. No. 2,594,538 also discloses a method of making caramel with sucrose and orange juice acid (citric acid) by heating at a temperature of preferably 120° C. The patent does not disclose mixing the reactants in a mill.

Heretofore there has not been a method for producing caramel compositions containing fructose oligosaccharides. Thus, a need exists for the preparation of caramel which contains a high content of fructose oligosaccharides.

SUMMARY OF THE INVENTION

It is accordingly an object of the present invention to produce a caramel product having a high content of fructose oligosaccharides.

It is further an object of the present invention to develop a process which maximizes the content of fructose oligosaccharides in the product.

In accordance with these and other objects, the present invention provides a process for producing caramel which comprises:

milling sucrose and an organic acid; heating at a temperature which is above the melting point of the milled sucrose and organic acid; and cooling the mixture.

Preferably the milling is performed in a ball mill for about 0.5 to 4 hours, depending on the degree of crystallinity of the starting materials. A preferred starting composition comprises about 90 to 99.1 wt. % sucrose and about 0.1 to 10 wt. % citric acid. The heating temperature is preferably between about 5° to 25° C. above the melting temperature of the milled sucrose and organic acid. The preferred melt time is about 0.5–15 minutes, generally with constant mixing.

DETAILED DESCRIPTION OF THE INVENTION

According to the present invention, it has been found that it is possible to produce a caramel having a high content of fructose oligosaccharides. These oligosaccharides modify intestinal bacteria, and are effective in increasing the proportion of bifidobacteria in the digestive tract of animals (e.g. poultry, pigs, rabbits) or humans. Thus, products containing fructose oligosaccharides are more nutritional.

The caramel is prepared by milling sucrose and an organic acid in order to reduce the crystallinity of the sucrose, resulting in an intimate mixture of the sucrose and the organic acid. At least a portion of the sucrose becomes amorphous.

The milling is preferably carried out with a ball mill for at least about 0.5 hours and more preferably at least about 2 hours. Generally, and depending on the initial state or crystallinity of the sucrose and organic acid, the milling need not be carried out for longer than 4 hours, especially if powdered sucrose is used as the starting material. If powdered sucrose is the starting material, ball milling is carried out for about 1 to 3 hours. If coarse sucrose is used as the starting material, the milling procedure will be extended accordingly until the sucrose and organic acid are suitably pulverized. The course sucrose should be pulverized to the same degree as the powdered sucrose after 1 to 3 hours of ball milling.

The preferred means by which the sucrose and organic acid are milled is by use of a ball mill. However, other methods of milling may be used as long as the sucrose and organic acid is finely pulverized and intimately admixed and the objectives of the present invention are achieved.

The milling finely pulverizes the mixture of the sucrose and organic acid and the sucrose becomes at least partially amorphous. The milling has the effect of reducing the thermolization temperature of the sucrose, resulting in lower caramelization temperatures than customarily found in the prior art. Typically, the milling is continued until the melting point of the sucrose and organic acid is reduced to below about 140° C., e.g. 130°–145° C.

The milled product is then heated, most preferably with constant mixing, until it melts and thereafter held for a fixed "melt time" at a suitable temperature before cooling rapidly to room temperature. The mixture will generally pass through a dough stage and form a liquid.

The melt time is defined as the time period immediately after complete melting of the milled sucrose and organic acid and immediately before the subsequent cooling. Suitable melt times are 0.5 to 15 minutes and suitable melt temperatures are between about 130° C. and 160° C. Preferably the melt temperature is between about 140° and 150° C. The melt temperatures will generally be about 5° to less than 25° C. higher than the melting point of the milled product. Preferably, the melt temperature will be about 15° C. higher than the melting point of the milled product, and more preferably about 10° C. higher the melting point of the milled product.

The preferred melt time is about 0.5 to about 15 minutes, however, preferably the melt time is at least greater than 1 minute, and more preferably between about 3 and 10 minutes. Longer melt time periods up to about an hour are within the scope of the present invention as long as the objectives of the present invention are achieved and the caramel product contains a high content of fructose oligosaccharides.

The liquid is subsequently cooled rapidly to room temperature. The rapid cooling preferably reduces the temperature of the liquid to about 10° C. or more below the carmalization temperature within about 1 minute. More preferably, the cooling preferably reduces the temperature of the liquid to about 20° C. or more below the carmaelization temperature within about 1 minute.

The cooling is generally most effectively carried out by contacting the caramelized product with a cool surface. For example, after heating, the caramel may be poured from the heated container in which thermolysis was conducted to a cooled container. Conversely, the caramel may be contacted with rapidly flowing cool air, or the heated container may be submerged in a cold liquid. Other cooling means are within the scope of the present invention.

The organic acid used according to the present invention is preferably a non-volatile, comestible reagent, such as citric acid or tartaric acid. Citric acid is the most preferred reagent, however, the reagent used according to the present invention may include any other organic acid and/or mixtures thereof suitable to achieve the objectives of the present invention. Thus, malic acid, carbonic acid, phosphoric acid, sulfuric acid, sulfurous acid, acetic acid and the like and mixtures thereof are not excluded from the scope of the present invention.

The ratio of the sucrose to the organic acid may vary, however, it is preferred that a small amount of organic acid be used as the reagent. Generally, the organic acid comprises less than about 10 wt. % of the mixture and at least about 0.1 wt. %, the balance being sucrose. Preferably, less than about 5 wt. % of the organic acid is present, and more preferably the organic acid should be present in an amount of about 1.0 to 2.5 wt. %.

In addition to sucrose, other sugars or carbohydrates may be used in conjunction with sucrose according to the present invention as long as the objectives of the invention are achieved and the product contains a high proportion of fructose oligosaccharides. The additional sugars and/or carbohydrates may be milled with the sucrose and organic acid with a proportional increase in the amount of organic acid used as the reagent in order to ensure that the ratio of the sucrose and organic acid remains within the above-described ranges. Conversely, the additional sugars and/or carbohydrates may be added after milling, but with good mixing. Other sugars useful in the present invention include but are not limited to glucose, mannose, fructose, and lactose.

If additional sugars and/or carbohydrates are added, the sucrose and organic acid should comprise the bulk of the mixture in order to achieve the objectives of the present invention and produce a caramel product which contains a high amount of fructose oligosaccharides. Most preferably, the mixture will not contain any additional sugars and/or carbohydrates.

Thus, the process for producing caramel according to the present invention essentially comprises milling sucrose and with an organic acid; preferably a non-volatile organic food acid; heating at a temperature which is above the melting point of the milled sucrose and non-volatile food acid for about 0.5 to 15 minutes; and cooling to room temperature.

A more preferred process for producing caramel comprises the steps of ball-milling about 90 to 99.1 wt. % sucrose and about 0.1 to 10 wt. % citric acid for about 0.5 to 4 hours; heating at a temperature of about 130°-160° C. for about 0.5-15 minutes with constant mixing; and cooling rapidly to room temperature.

The composition of the product may be determined by high performance liquid chromatography and by gel chromatography. The desired range of degree of polymerization (DP) in the fructose oligosaccharide is 3-20. There is a wide range of linkage types and orientations in the oligosaccharides.

The caramel prepared according to the present invention contains at least about 20% fructose oligosaccharides. Other major components include glucose, fructose, sucrose, and kestose.

The range of contents of the major components of a caramel prepared according to the present invention is:
30-55% glucose and fructose;
5-15% sucrose;
5-20% kestoses; and
20-50% fructose oligosaccharides having a DP of about 3-10.

The caramel product prepared according to the present invention is superior in composition than prior caramel compositions because of the high content of fructose oligosaccharides. Fructose oligosaccharides modify intestinal bacteria and in particular are effective in increasing the proportion of bifidobacteria in the digestive tract of animals and humans. Thus, a caramel product which contains fructose oligosaccharides is more nutritious than caramels which do not contain these oligosaccharides.

The caramel product prepared according to the present invention has numerous uses as it may be used in place of any other caramel product. Thus, the final raw caramel product may be mixed with additional sugars, vitamins, flavorings, colorings, etc., and whatever else is necessary to prepare the caramel into a particular comestible substance. Caramels are typically used to color foods, and in confectionery and galenical products.

The following examples are provided and represent the preferred mode of the present invention.

EXAMPLE 1

Sucrose (1500 g) and citric acid (15 g) were milled with 10 lb Burundum cylinders (1¼×1¼ inch) at 60 rpm for 2 hours in a 1¼ gallon Roalox jar. A sample of the resulting white powder (500 g) was heated in an aluminum pan with constant stirring until it was completely melted. A thermometer was immediately inserted and stirring and heating continued at a temperature of 145° to 150° C. for 7 minutes from the time of complete melting. The liquid product was immediately poured into another cold aluminum pan and cooled to room temperature. The product was a pale mahogany colored glass.

High performance liquid chromatography of a 5% aqueous solution was carried out on a Waters Radial Compression RP 18 column with water elution at 1 ml/min and products determined by external reference standards of glucose and sucrose. The content of kestoses was calculated using the sucrose response factor. The content of higher fructose oligosaccharides was determined by difference. The product contained glucose plus fructose (50%), sucrose (12%), kestoses (10%) and higher fructose oligosaccharides (27%).

Gel chromatography was carried out on Biogel P2 and showed a continuum of oligosaccharide sizes from DP 2-20, with a maximum at 6 (maltodextrin references), with a large glucose peak and a smaller peak superimposed.

EXAMPLE 2

The procedure of Example 1 was repeated using 37.5 g of citric acid (i.e. 2.5% based on sucrose). The resultant powder was melted as before and held at 140°-145° C. for 7 minutes from the time of complete melting. The product was a mahogany colored glass.

Analysis as in Example 1 indicated a presence of glucose plus fructose (48%), sucrose (5%), kestoses (10%), and higher oligosaccharides (34.5%).

EXAMPLE 3

The procedure of Example 1 was repeated exactly, except that the melt temperature was maintained at 145°-150° C. for 5 minutes instead of 7 minutes. The product contained glucose plus fructose (46%), sucrose (13%), kestoses (11%), and higher fructose oligosaccharides (29%).

The processes disclosed in the above Examples 1-3 may be characterized as batch processes, however, continuous processes which will produce the desired product are within the scope of the present invention. Trace amounts of mineral acids may also be employed as long as the objectives of the present invention are achieved and a caramel product is prepared having a high content of fructose oligosaccharides.

Other variations and modifications of the invention as described herein in detail will be apparent to those skilled in the art and are intended to be encompasses by the present description and claims.

I claim:

1. A process for producing caramel comprising:
   pulverizing a mixture of sucrose and an organic acid for a sufficient time to form a finely pulverized mixture and to reduce the thermalization temperature of the sucrose;
   (b) heating said mixture at a temperature which is above the melting point of the mixture of sucrose and organic acid until the mixture melts and continuing said heating until fructose oligosaccharides are formed;
   (c) cooling the mixture;
   (d) and recovering a caramel which contains fructose oligosaccharides.

2. The process according to claim 1, wherein the melt time of the heating is about 0.5 to 15 minutes.

3. The process according to claim 1, wherein the milling is continued until the melting point of the sucrose and organic acid is reduced to about 130° to 145° C.

4. The process according to claim 1, wherein about 90 to 99.1 wt. % sucrose and 0.1 to 10 wt. % organic acid is milled.

5. The process according to claim 2, wherein the heating temperature is less than about 25° C. above the melting point of the sucrose and organic acid.

6. The process according to claim 1, wherein the sucrose and organic acid is heated at a temperature of about 130° to 160° C.

7. The process according to claim 3, wherein the pulverization is carried out by milling in a ball-mill for approximately 0.5 to 4 hours.

8. The process according to claim 1, wherein the organic acid is a non-volatile organic food acid.

9. The process according to claim 1, wherein the organic acid is selected from the group consisting of citric acid, malic acid, tartaric acid, carbonic acid, phosphoric acid, sulfuric acid, sulfurous acid and acetic acid.

10. The process according to claim 9, wherein the organic acid is citric acid.

11. A process for producing caramel having a high content of fructose oligosaccharides comprising:
    ball-milling about 90 to 99.1 wt. % sucrose and about 0.1 to 10 wt. % citric acid for about 0.5 to 4 hours;
    heating at a temperature of about 130°-160° C. for about 0.5-15 minutes with constant mixing; and
    cooling rapidly to room temperature.

12. A caramel product prepared according to the process of claim 1.

13. A caramel product containing at least about 20% of fructose oligosaccharides.

14. The caramel product according to claim 13 wherein the carmel additionally comprises glucose, fructose and sucrose.

15. The caramel product according to claim 13, additionally comprising at least one selected from the group consisting of vitamins, flavorings and colorings.

16. The caramel product according to claim 13 comprising:
    about 30-15% glucose and fructose;
    about 5-55% sucrose;
    about 5-20% kestoses; and
    about 20-50% fructose oligosaccharides.

17. A process according to claim 1, wherein the pulverization step is carried out by milling.

18. A caramel product produced by the process of claim 11.

* * * * *